(12) United States Patent
Whitaker et al.

(10) Patent No.: US 9,748,980 B2
(45) Date of Patent: Aug. 29, 2017

(54) APPARATUS AND METHODS OF ACCESSING ALL CHANNELS OF A SUPERHETERODYNE RECEIVER SIMULTANEOUSLY

(71) Applicant: The United States of America as represented by the Secretary of the Navy, Crane, IN (US)

(72) Inventors: George Whitaker, Albuquerque, NM (US); Jeff Maas, Bloomington, IN (US); Andrew Christianson, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/845,248

(22) Filed: Sep. 3, 2015

(65) Prior Publication Data

US 2015/0381213 A1     Dec. 31, 2015

Related U.S. Application Data

(62) Division of application No. 14/244,947, filed on Apr. 4, 2014.

(60) Provisional application No. 61/842,715, filed on Jul. 3, 2013.

(51) Int. Cl.
| | |
|---|---|
| *H04B 1/16* | (2006.01) |
| *H04W 4/00* | (2009.01) |
| *H04B 1/00* | (2006.01) |
| *H04B 1/28* | (2006.01) |
| *G01S 5/02* | (2010.01) |
| *H04L 29/08* | (2006.01) |

(52) U.S. Cl.
CPC .......... *H04B 1/0053* (2013.01); *G01S 5/0205* (2013.01); *H04B 1/28* (2013.01); *H04L 67/12* (2013.01)

(58) Field of Classification Search
CPC ... H04B 1/22; H04B 1/26; H03D 7/16; H03D 11/02; G01S 3/023; G01S 3/14; G01S 3/28; G01S 3/32; G01S 3/46; G01S 5/12
USPC .... 455/323–324, 334, 336, 431; 342/30, 37, 342/118, 418
See application file for complete search history.

(56) References Cited

U.S. PATENT DOCUMENTS

| | | | | |
|---|---|---|---|---|
| 4,114,601 | A * | 9/1978 | Abels | A61B 5/06 128/899 |
| 5,276,450 | A * | 1/1994 | Schwegman | G01S 7/36 342/16 |
| 6,060,815 | A * | 5/2000 | Nysen | G01S 13/758 310/318 |
| 7,006,032 | B2 | 2/2006 | King et al. | |
| 7,398,056 | B1 | 7/2008 | Ebert | |
| 7,436,350 | B1 | 10/2008 | Maloratsky | |
| 2001/0040526 | A1 * | 11/2001 | Smith | G01S 3/023 342/418 |
| 2002/0102951 | A1 * | 8/2002 | Nakano | H03D 7/00 455/118 |
| 2003/0006901 | A1 * | 1/2003 | Kim | G06K 7/0008 340/572.5 |

(Continued)

*Primary Examiner* — Simon Nguyen
(74) *Attorney, Agent, or Firm* — Christopher A. Monsey

(57) ABSTRACT

An apparatus and method associated with exploiting a characteristic in super-heterodyne receivers such that a modulated signal will be received on all channels simultaneously regardless of the channel selected on the receiver.

9 Claims, 7 Drawing Sheets

(56) References Cited

U.S. PATENT DOCUMENTS

| | | |
|---|---|---|
| 2003/0093187 A1 | 5/2003 | Walker |
| 2004/0212358 A1* | 10/2004 | Stephen .................... H03J 7/32 |
| | | 324/76.19 |
| 2007/0063875 A1 | 3/2007 | Hoffberg |
| 2008/0284637 A1* | 11/2008 | Blessing ................... G01S 3/46 |
| | | 342/30 |
| 2008/0312780 A1 | 12/2008 | Peed et al. |
| 2010/0040120 A1* | 2/2010 | Sharma ............. H04W 52/0235 |
| | | 375/219 |
| 2011/0215960 A1* | 9/2011 | Stevens .................... G01S 7/36 |
| | | 342/37 |
| 2013/0176163 A1* | 7/2013 | Margolin .................. G01S 5/12 |
| | | 342/118 |
| 2013/0310023 A1* | 11/2013 | Bevan .................. H04B 1/1027 |
| | | 455/423 |
| 2013/0315287 A1* | 11/2013 | Cornic .................... G01S 3/40 |
| | | 375/224 |

* cited by examiner

APPARATUS AND METHODS OF ACCESSING ALL CHANNELS OF A SUPERHETERODYNE RECEIVER SIMULTANEOUSLY

CROSS-REFERENCE TO RELATED APPLICATIONS

The present application is a divisional of U.S. patent application Ser. No. 14/244,947, filed Apr. 4, 2014, which claims priority to U.S. Provisional Patent Application Ser. No. 61/842,715, filed Jul. 3, 2013, both entitled "Apparatus and Methods of Accessing All Channels of a Superheterodyne Receiver Simultaneously," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 102,716A) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to interaction with an electronics system. One example can include simultaneously accessing all channels of a superheterodyne audio receiver of interest. Using methods and apparatus in accordance with examples of the invention, a modulated signal can be received or detected simultaneously on all channels of a receiving device that employs a superheterodyne design, regardless of the channel selected on the receiving device.

An exemplary embodiment of the present invention relates to one or more apparatuses and methods operable for simultaneously accessing all channels of a superheterodyne receiver. Using exemplary aspects of the invention including methods and apparatus described herein, a transmitted signal can be received or detected at a receiving device that employs a superheterodyne design as long as the radio is powered on.

One aspect of an exemplary embodiment of the invention includes an aspect enabling a system to be directional, affecting only selected devices or omni-directional affecting all devices of targeted design within range.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
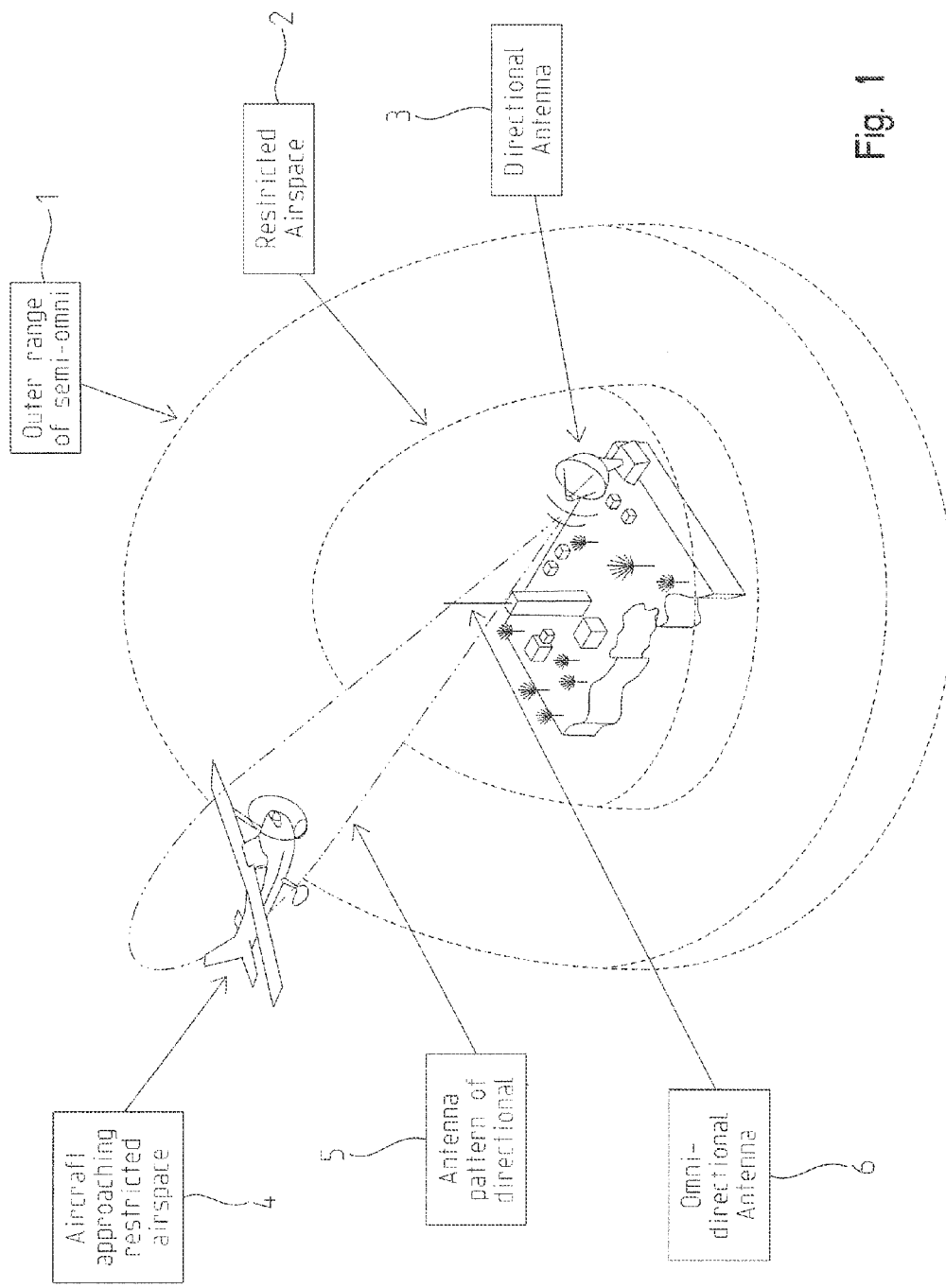
FIG. 1 shows an exemplary diagram where an exemplary device in accordance with one embodiment of the invention might be used.

Referring initially to FIG. 1, illustrates an exemplary situation where an embodiment of the invention, not shown in this figure (e.g. see FIG. 4), might be used. In this exemplary situation, a temporary controlled air space 2 has been declared and a small aircraft 4 is approaching this airspace. An employee or agent of an activity seeking to influence entities within or related to this controlled airspace attempts to hail the small aircraft 4. However, communication bands of aviation radios have over 800 channels and agent or employee does not know what channel the small aircraft 4 pilot is monitoring. The agent or employee can hail the pilot on all channels simultaneously using an exemplary embodiment of the invention. An exemplary omni-directional antenna 6 can be used with the invention to create a hemispherical transmission/reception zone where the size of the zone can be dependent upon such an antenna's transmitter power within the controlled airspace 2 with an un-modulated frequency. A pilot would not receive comprehensible messages or information on an aircraft radio from a signal where an unmodulated signal or frequency is used. A directional antenna 3 can be adapted to transmit a narrow beam 5 at a desired aircraft e.g., aircraft 4 within the controlled airspace 2. This narrow beam can be modulated with a message and may extend outside of the zone created by the omni-directional antenna 6, but only the aircraft 4 that receives both frequencies, i.e. is within the zone created by the omni-directional antenna 6 transmitting the first frequency and is within the directional antenna transmitting the narrow beam 6 on a second frequency will receive a desired message as well as resulting in the aircraft 4 receiving the message on all channels simultaneously.

Figure 2:
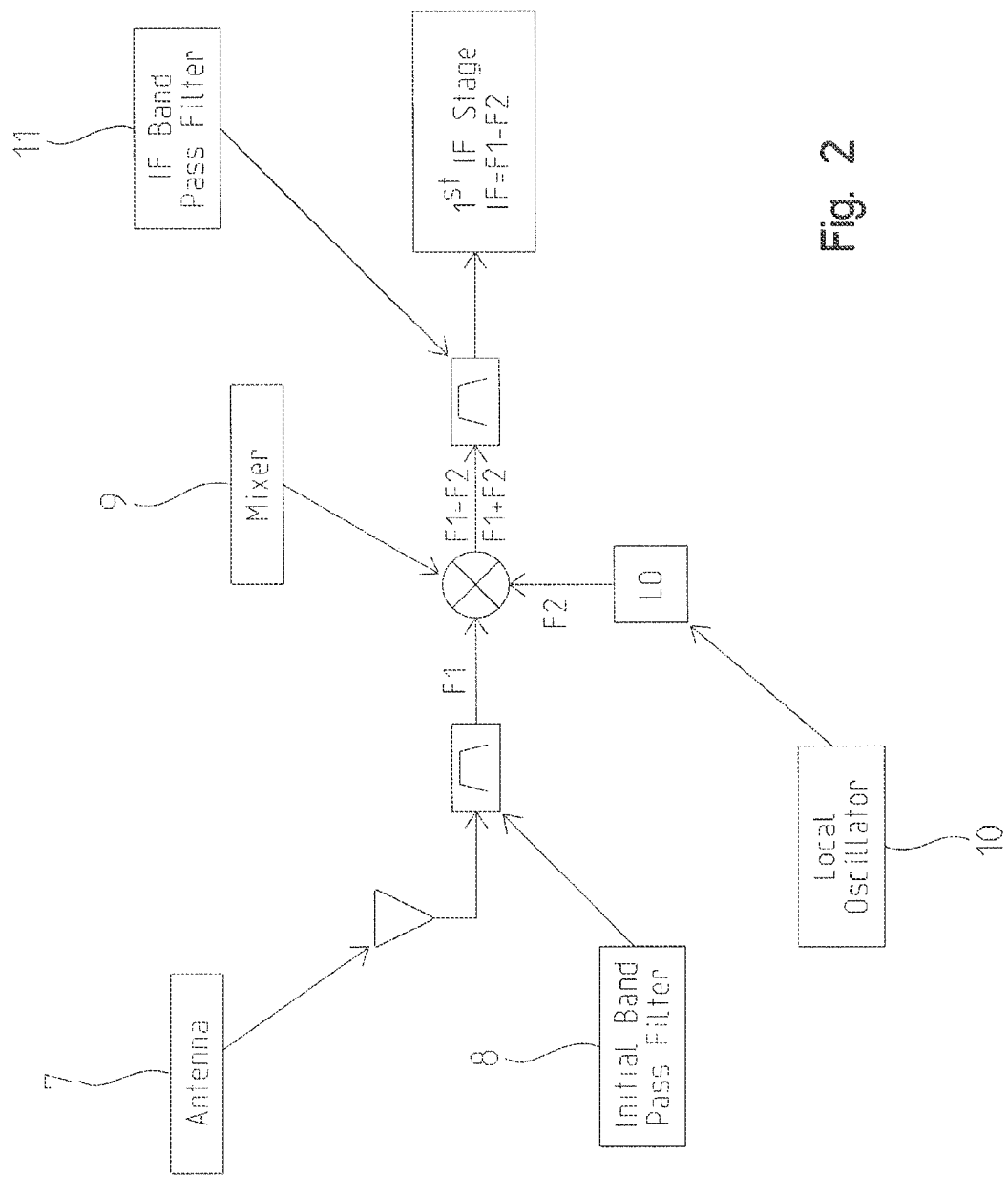
FIG. 2 shows an exemplary diagram of a front end of a receiver to illustrate how an one example of an interaction with a receiver.

FIG. 2 shows an exemplary embodiment, e.g., a typical superheterodyne receiver. The following two figures provide an exemplary description for interacting with a superheterodyne receiver. The examples provided herein may be amenable to several heterodyne based radios. An embodiment of the invention can be used on the super-heterodyne architecture. Multiple stage super-heterodyne receivers are variations on a basic super-heterodyne receiver. Receivers, such as discussed herein, have a similar or same front end and are susceptible to a same or similar interaction with an exemplary embodiment of the invention. The exemplary system shown in FIG. 2 includes a receiver antenna 7. The exemplary FIG. 2 system also includes an initial band pass filter 8 which only allows RF frequencies received by the antenna that are in a desired band to pass through. In this example, a system is shown using a civilian aviation communications band of 118 to 137 MHz. An exemplary system can also utilizes a reference frequency F2 supplied by a local oscillator, in this example 139.4 to 158.4 MHz. A mixer 9 takes signals that pass through a filter 8, referred to as F2, and mixes the signals with a local oscillator frequency referred to as F1 and outputs F1+F2 and F1−F2. An IF band pass filter 11 can be provided which, in this exemplary embodiment, is a very narrow filter set at a desired intermediate frequency (IF) (e.g., in this example it is centered at 21.4 MHz). In this example, since this filter only allows the narrow band of 8 to 25 KHz centered at 21.4 MHz into an IF stage, a user can select which input frequency or channel they want by adjusting the local oscillator frequency. In one example, to select the 118 MHz channel, a user or system can tune the local oscillator to 139.4 MHz then F1−F2=139.4−118=21.4 MHz. If a user desires a 136 MHz channel, the user or system will then tune the local oscillator to 158.4 MHz and F1−F2=158.4−136=21.4 MHz. In another example, where a user or system tunes a local oscillator to a frequency of 21.4 MHz higher than the desired frequency then the difference will be 21.4 MHz and only that frequency will pass through the IF band pass filter.

Figure 3:
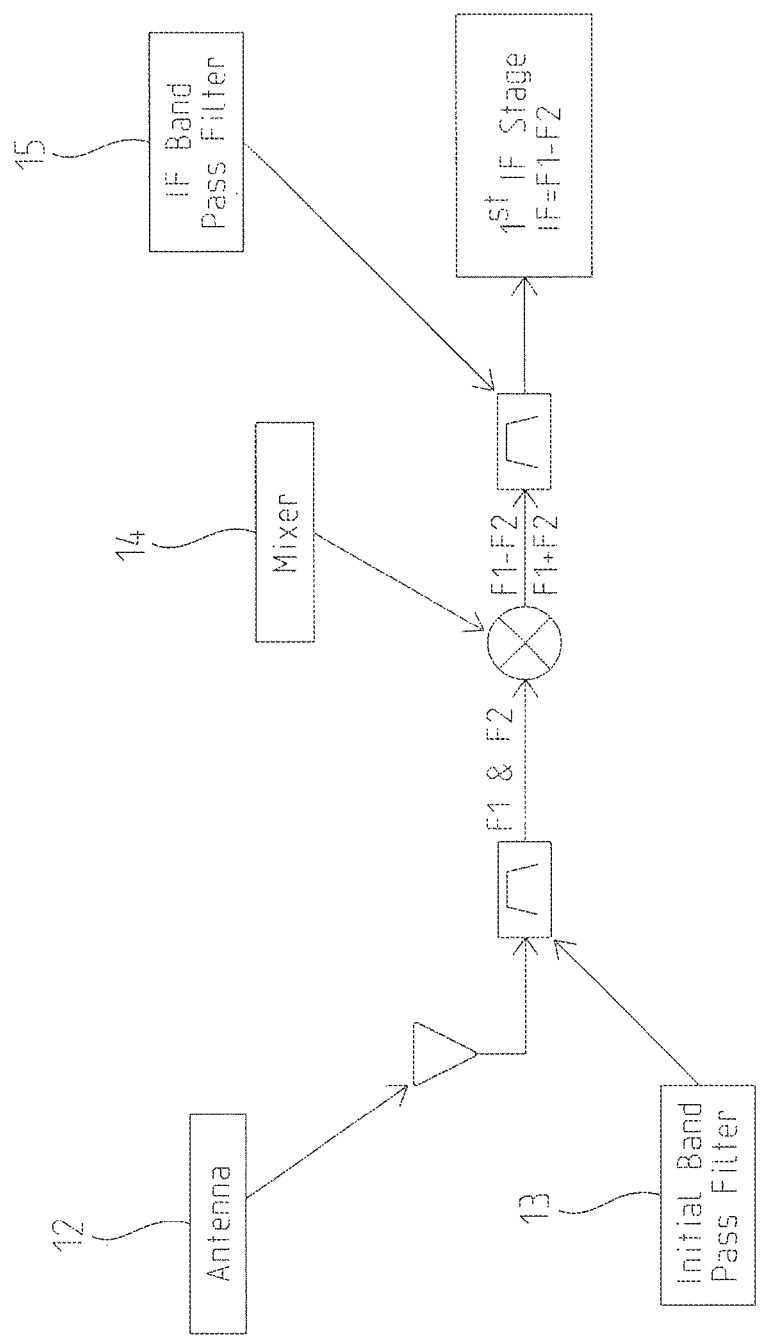
FIG. 3 shows a functional schematic in accordance with one embodiment of the invention.

FIG. 3 describes an interaction in accordance with an embodiment of the invention. In one embodiment, a basic aspect of design that super-heterodyne receivers relies upon relates to supplying an internal un-modulated frequency, sometimes known as a local oscillator signal, to mix with all frequencies received by an antenna that pass through an initial band pass filter; only a received frequency that mixes to yield F1−F2=IF passes on to IF circuitry. In this example radio, an IF is 21.4 MHz. One exemplary interaction used herein provides one or more continuous wave (CW) tones (un-modulated transmitted signals) and a modulated signal that, when mixed, can result in a desired IF frequency. In this example, an initial band pass filter is a single order filter with corners at 118 and 137 MHz. With a single order filter frequencies set at half the lower corner or twice the upper corner are attenuated to one half the power of the pass band so that signals at frequencies between these half power points and the corner frequencies can still get to the mixer; such signals require an additional transmitting power. In this example, F1 and F2 are both received by an antenna 12, F1 is a CW signal set in an upper corner of the band pass filter 13, and F2 is a modulated frequency set in the lower corner of this filter and they are separated by the IF frequency of 21.4 MHz, then when these input signals are mixed in the mixer, F1−F2 will be equal to the IF frequency.

Figure 4:
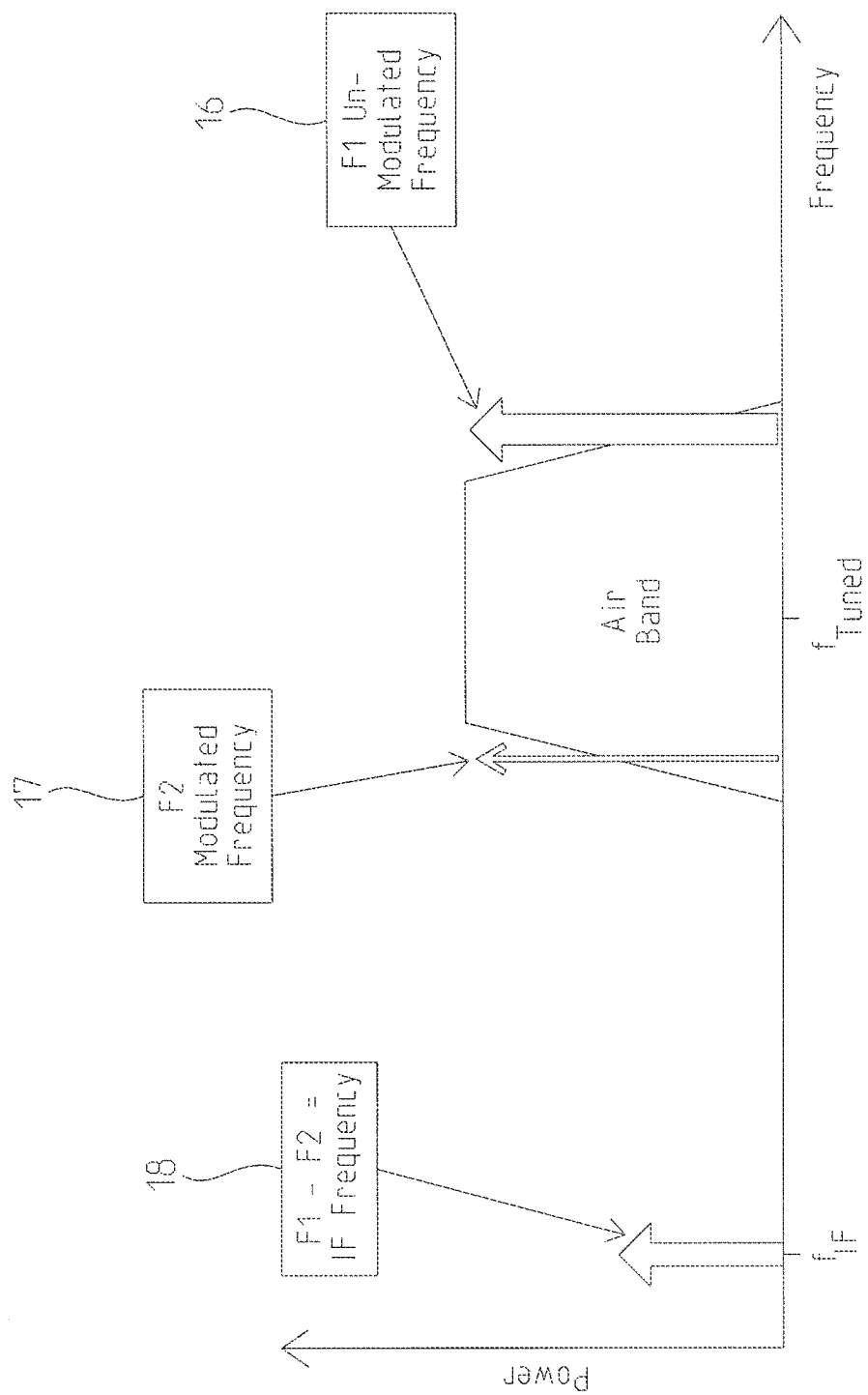
FIG. 4 shows a power to frequency chart showing relationships of modulated and unmodulated frequencies in accordance with one embodiment of the invention.

Referring to FIG. 4, in this example, a CW unmodulated frequency 16 can be set at 137.7 MHz and a modulated frequency 17 can be set at 113.3 MHz. An IF 18 can then be determined as 137.7 MHz−116.3 MHz=21.4 MHz. In this example the two selected frequencies are just barely in the shoulders of the band pass filter, so very little attenuation will result from operation of this exemplary system. Low attenuation results in this case can be expected when this example is used with many aviation radios given designers of such radios generally select a low IF frequency (<30 MHz) and such an aviation communications band that the filter must pass is specified by standard as 19 MHz.

Figure 5:
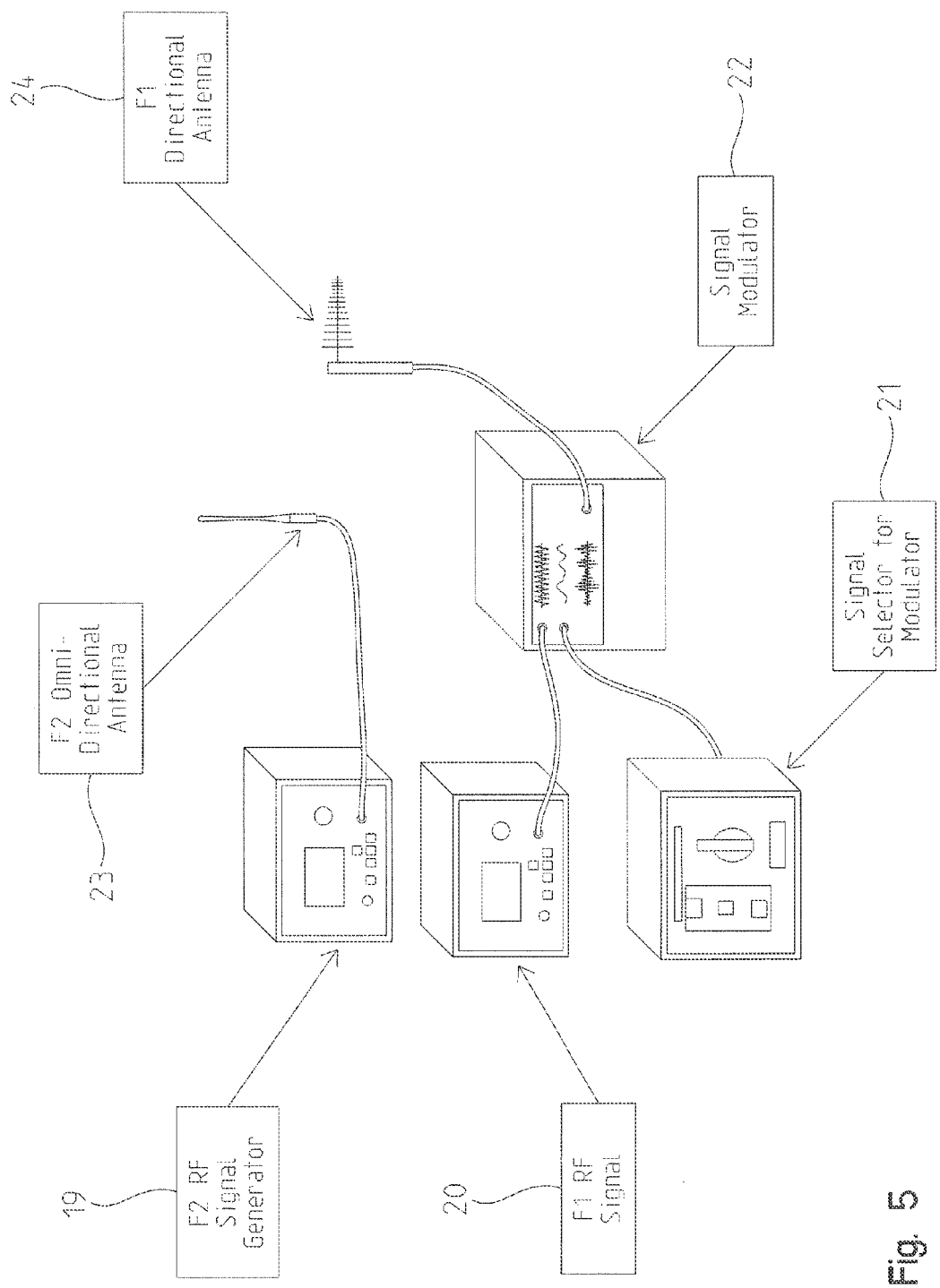
FIG. 5 shows an exemplary schematic description of a system in accordance with one embodiment of the invention.

FIG. 5 shows an implementation of an exemplary interaction system with an example radio. An embodiment of the invention can include an RF signal generator 19 set at frequency F1, e.g., 137.7 MHz. An RF signal generator 20 can be set at, e.g., 116.3 MHz. An audio signal selector 21 can allow a user to select a tone, a recorded message, or live audio from a microphone for use to modulate a signal F1. The RF modulator 22 modulates audio onto a desired RF signal. An omni-directional antenna 23 transmits a CW signal roughly covering a zone or bubble such as, e.g., shown in FIG. 1. A directional antenna 24 illuminates a target aircraft with a modulated F2 signal.

Alternative embodiments can include multiple CW tone frequencies for cases where two frequencies within the initial pass band do not exist for which F1−F2 or F1+F2 is equal to an IF frequency. In this example, if three frequencies are used then a mixer output comprises triplets F1+F2+F3, F1+F2−F3, F1−F2+F3, F2+F3−F1, F1−F2−F3 as well as couplets F1−F2, F1+F2, F1−F3, F1+F3, F2−F3 and F2+F3 where F1, F2 and F3 are all in the pass band and F1 is larger than F2 and F2 is larger than F3 and only one frequency is modulated.

Figure 6:
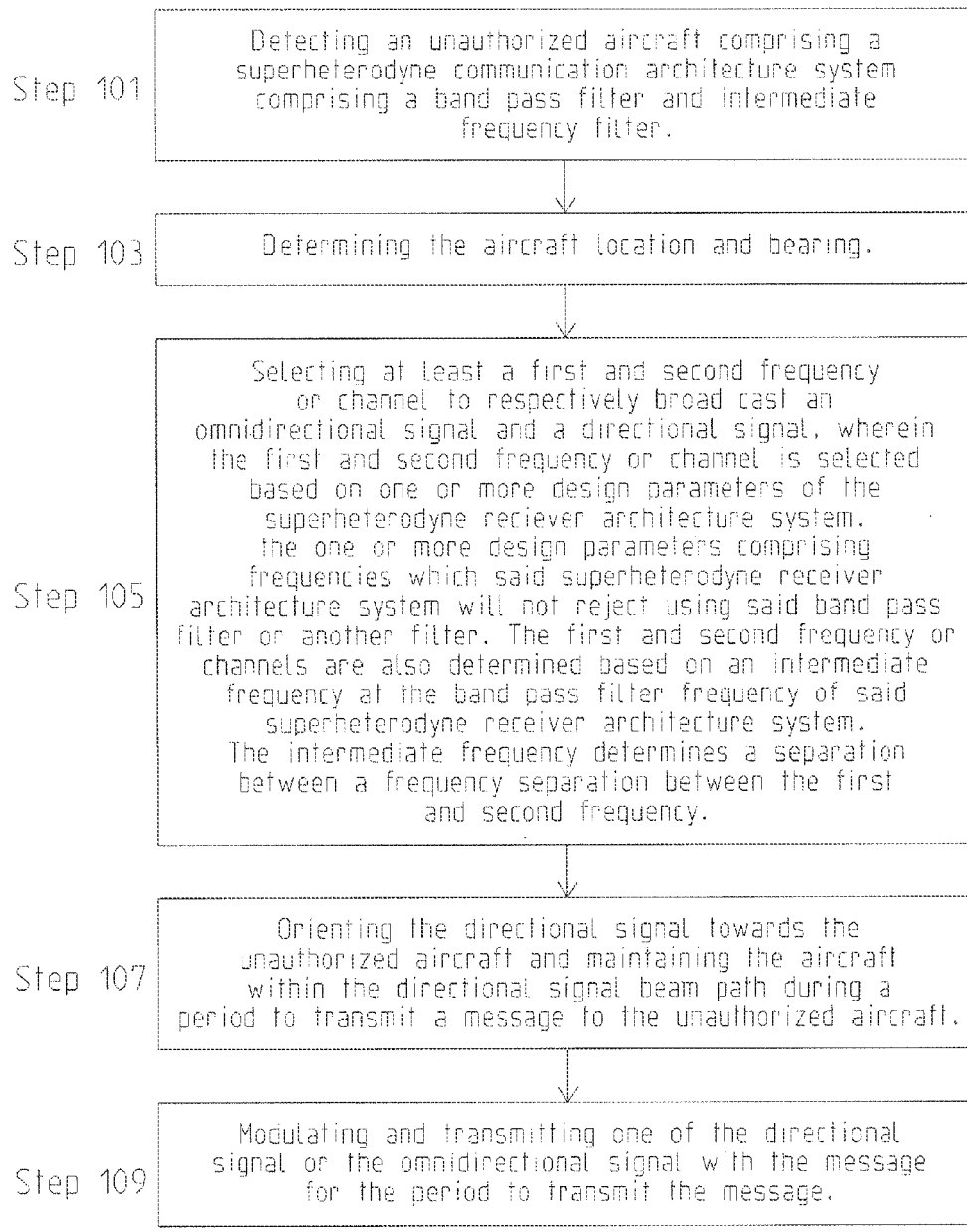
FIG. 6 shows an exemplary method in accordance with one embodiment of the invention.

FIG. 6 shows a method of communicating with an entity having an unknown selection of radio communication channel setting in accordance with one embodiment of the invention. At step 101, detecting an unauthorized aircraft comprising a superheterodyne communication architecture system comprising a band pass filter and intermediate frequency filter. At step 103, determining the aircraft location and bearing. At step 105, selecting at least a first and second frequency or channel to respectively broad cast an omnidirectional signal and a directional signal, wherein the first and second frequency or channel is selected based on one or more design parameters of the superheterodyne receiver architecture system, the one or more design parameters comprising frequencies which said superheterodyne receiver architecture system will not reject using said band pass filter or another filter. The first and second frequency or channels are also determined based on an intermediate frequency at the band pass filter frequency of said superheterodyne receiver architecture system. The intermediate frequency determines a separation between a frequency separation between the first and second frequency. At step 107, orienting the directional signal towards the unauthorized aircraft and maintaining the aircraft within the directional signal beam path during a period to transmit a message to the unauthorized aircraft. At step 109, modulating and transmitting one of the directional signal or the omnidirectional signal with the message for the period to transmit the message. In one embodiment of the invention, one of the omnidirectional signal or direction signal comprises of multiple frequencies. Another embodiment can add a step of selecting additional frequencies or channels to generate additional frequency products within a one or more band pass filters of the superheterodyne communication architecture systems for matching different respective intermediate frequencies.

Figure 7:
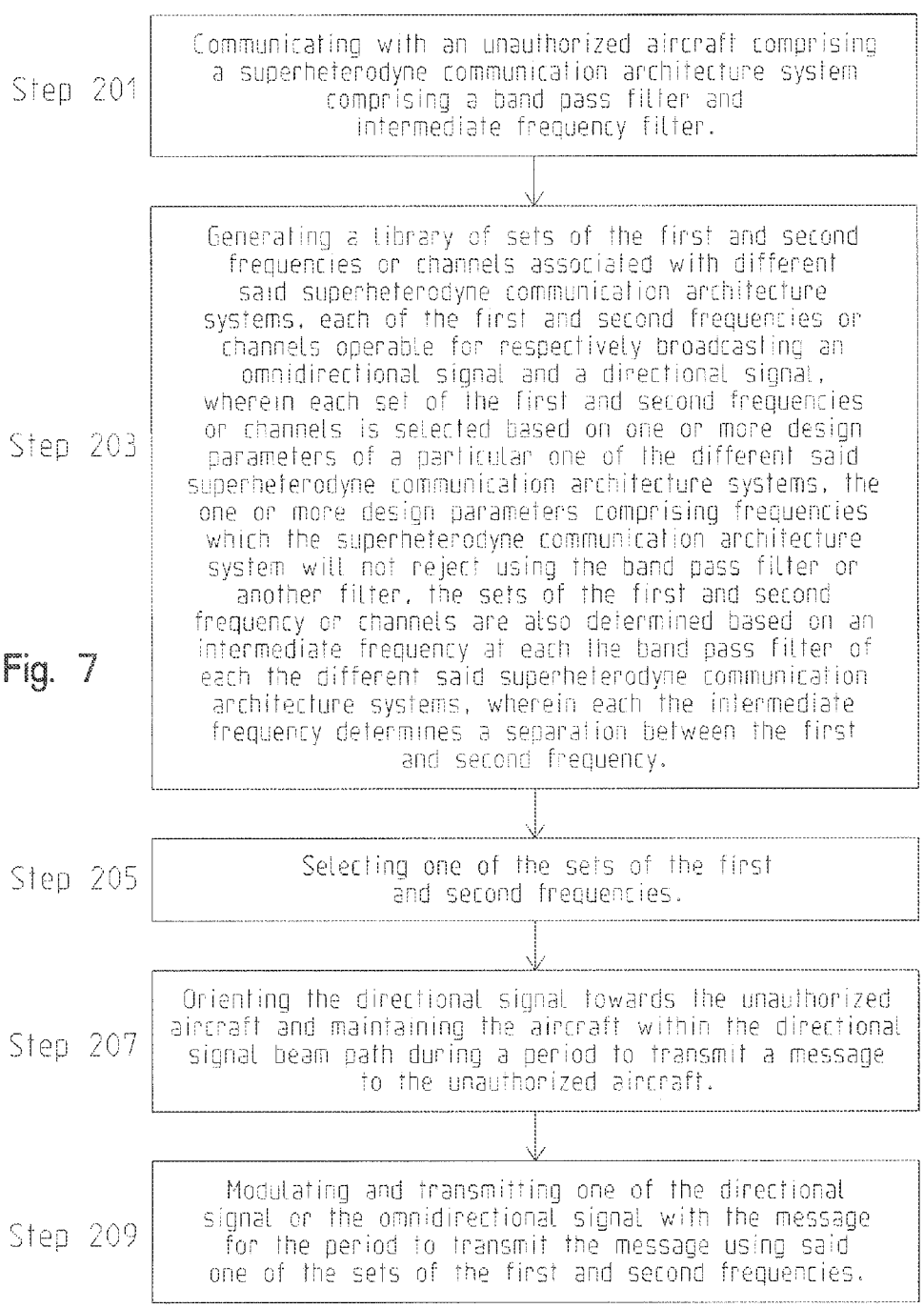
FIG. 7 shows another exemplary method in accordance with another embodiment of the invention.

FIG. 7 shows another alternative method of communicating with an entity having an unknown selection of radio communication settings in accordance with another embodiment of the invention. At step 201, communicating with an unauthorized aircraft comprising a superheterodyne communication architecture system comprising a band pass filter and intermediate frequency filter. At step 203, generating a library of sets of the first and second frequencies or channels associated with different said superheterodyne communication architecture systems, each of the first and second frequencies or channels operable for respectively broadcasting an omnidirectional signal and a directional signal, wherein each set of the first and second frequencies or channels is selected based on one or more design parameters of a particular one of the different said superheterodyne communication architecture systems, the one or more design parameters comprising frequencies which the superheterodyne communication architecture system will not reject using the band pass filter or another filter, the sets of the first and second frequency or channels are also determined based on an intermediate frequency at each the band pass filter of each the different said superheterodyne communication architecture systems, wherein each the intermediate frequency determines a separation between the first and second frequency. At step 205, selecting one of the sets of the first and second frequencies. At step 207, orienting the directional signal towards the unauthorized aircraft and maintaining the aircraft within the directional signal beam path during a period to transmit a message to the unauthorized aircraft. At step 209, modulating and transmitting one of the directional signal or the omnidirectional signal with the message for the period to transmit the message using said one of the sets of the first and second frequencies. An alternative embodiment can have one of the omnidirectional signal or direction signal comprises of multiple frequencies. Another alternative embodiment can include selecting additional frequencies or channels to generate additional frequency products within a one or more band pass filters of the superheterodyne communication architecture systems for matching different respective intermediate frequencies. An alternate embodiment can include a case wherein the modulation is other than amplitude modulation such as frequency, phase or any of the other digital or analog modulation schemes such as phase shift key or asymmetric phase shift key.

Although the invention has been described in detail with reference to certain preferred embodiments, variations and modifications exist within the spirit and scope of the invention as described and defined in the following claims.

The invention claimed is:

1. An energy output apparatus adapted for bypassing channel selection for a superheterodyne communication system, comprising:
   a first and second transmitter sections configured to selectively bypass channel selection for a superheterodyne receiver coupled to or mounted within a moving aircraft, wherein said first transmitter section is adapted to output a plurality of one or more first signals comprising frequencies that are continuous wave unmodulated signals, said second transmitter section is adapted to output a plurality of second signals with a frequency that is modulated with a tone, a recording, or live audio, wherein one of said first or second transmitter sections is adapted to produce an omnidirectional output signal and the other transmitter section is adapted to produce a directional output signal aimed at said moving aircraft that comprises said superheterodyne receiver, wherein said first and said second transmitter sections are adapted to selectively transmit said first and second signals each having a selected carrier frequency within or very near corner frequencies of a pass band filter of said superheterodyne receiver such that said pass band filter passes both said omnidirectional and said directional signal output, wherein said selected carrier frequency is within or very near corner frequencies of said pass band filter such that negligible or manageable attenuation occurs;
   wherein said plurality of continuous wave signal's frequencies and the one modulated frequency combine in the superheterodyne receiver's mixer at an intersection of said first and second signals at said vehicle's location as sums and differences of all possible combinations resulting an intermediate frequency product which is passed through the pass band of said superheterodyne receiver;
   wherein said all frequencies are selected such that one combination of sums and differences is equal to the intermediate frequency of the superheterodyne receiver;
   wherein nonlinear components in said superheterodyne receivers perform frequency conversion on said all frequencies.

2. An energy output system as in claim 1, wherein said energy output apparatus is adapted to transmit both the continuous wave signals and the modulated signal from one or more antennas respectively coupled to said first and second sections to generate coverage sufficient to orient on said superheterodyne receiver upon activation.

3. An energy output system as in claim 1, wherein any said superheterodyne receiver with the intermediate frequency and the pass band that is in a range of the continuous wave receiver's signal frequencies and the modulated frequency will output the modulated audio on all channels of said superheterodyne receiver regardless where the receiver's radio tuner is set.

4. The energy output system as in claim 1, wherein the modulation is other than AM modulation such as frequency, phase or any of the other digital or analog modulation schemes such as phase shift key or asymmetric phase shift key.

5. The energy output system as in claim 1, wherein said second transmitter comprises a directional transmission antenna that is configured to transmit said second signal towards said vehicle.

6. The energy output system as in claim 1, wherein said vehicle comprises an aircraft mounting said superheterodyne communication system.

7. An apparatus for communicating with an entity having an unknown selection of radio communication channel settings, comprising:
   a control section comprising non-transitory library storing a plurality of different first intermediate frequencies (IF) and a plurality of frequency pairs in a non-transitory machine readable format within said control section, wherein said plurality of different first IFs are each respectively associated with one of a plurality of different superheterodyne communication architecture systems that may be installed in an aircraft, each of said plurality of superheterodyne communication architecture systems comprising a band pass frequency type with a first frequency range that allows a plurality of aircraft communications frequencies to pass through each of the band pass filter types, wherein said plurality of frequency pairs each comprising a respective F1 and F2 frequency value, wherein each of said respective F1 and F2 frequency values respectively associated with each of said frequency pairs is within the plurality of aircraft communication frequencies that will pass through the band pass filter types, wherein each said frequency pairs are each further defined so that when any two F1, F2 pairs are respectively differenced, the differenced product for each pair is respectively equal to one of the plurality of different first IFs;
   an omnidirectional antenna coupled with said control section;
   a narrow beam directional antenna coupled with said control section, wherein said controls section;
   detecting a first aircraft entering a predetermined restricted airspace;

an aircraft location detection system configured to determine a first aircraft's location and bearing from a point within a frame of reference;

wherein said control section has control logic that, in response to an operator or other control input, selects one of said plurality of frequency pairs each comprising a respective F1, F2, selects at a first and second transmission frequency each respectively equal to said one of said plurality of frequency pairs F1, F2, transmits an unmodulated omnidirectional first transmission signal at said first transmission frequency from said omnidirectional antenna, orients a beampath of said narrow beam directional antenna from said point within said frame of reference the directional antenna is located at along said bearing towards said first aircraft comprising one of said plurality of superheterodyne communication architecture systems, said control section further is adapted to selectively maintain said first aircraft within said beampath during a first time period, wherein said control system further selectively modulates and transmits a second transmission signal from said narrow beam antenna within said beampath with a message during said first time period so as to mix said first transmission signal and said second transmission signal at said first aircraft's location as it transits during said first period, wherein said control section further is configured to optionally select a different first and second transmission frequency each respectively equal to a different one of said plurality of frequency pairs F1, F2 if an operator in said first aircraft does not respond to said message and repeating said transmitting orienting, modulating and transmitting steps using the different first and second transmission frequency.

8. An apparatus as in claim 7, wherein said library comprising said plurality of frequency pairs each associated with one of said plurality of different IFs that are each respectively associated with one of said plurality of different superheterodyne communication architecture systems, wherein said step of selecting first and second transmission frequencies further comprises selecting said first and second transmission frequencies from said library based on a retrieval of one or more said frequency pairs from said library.

9. An apparatus as in claim 7, wherein said message comprises a tone, a recorded message, or live audio from a microphone.

* * * * *